United States Patent
Mateescu et al.

(10) Patent No.: US 9,274,884 B2
(45) Date of Patent: Mar. 1, 2016

(54) ENCODING AND DECODING DATA TO ACCOMMODATE MEMORY CELLS HAVING STUCK-AT FAULTS

(71) Applicant: HGST Netherlands B.V., Amsterdam (NL)

(72) Inventors: Robert Eugeniu Mateescu, San Jose, CA (US); Luiz Franca-Neto, Sunnyvale, CA (US); Cyril Guyot, San Jose, CA (US); Hessam Mahdavifar, San Diego, CA (US); Zvonimir Bandic, San Jose, CA (US); Qingbo Wang, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 404 days.

(21) Appl. No.: 13/649,098

(22) Filed: Oct. 10, 2012

(65) Prior Publication Data

US 2014/0101516 A1   Apr. 10, 2014

(51) Int. Cl.
*G06F 11/00* (2006.01)
*G06F 11/10* (2006.01)
*H03M 13/00* (2006.01)

(52) U.S. Cl.
CPC .......... *G06F 11/1012* (2013.01); *G06F 11/108* (2013.01)

(58) Field of Classification Search
None
See application file for complete search history.

(56) References Cited

U.S. PATENT DOCUMENTS

| | | | |
|---|---|---|---|
| 3,949,208 A | 4/1976 | Carter | |
| 6,839,275 B2 | 1/2005 | Van Brocklin et al. | |
| 6,996,017 B2 | 2/2006 | Scheuerlein et al. | |
| 7,069,494 B2 * | 6/2006 | Cargnoni et al. | 714/763 |
| 7,533,321 B2 * | 5/2009 | Bell et al. | 714/763 |
| 8,144,037 B2 | 3/2012 | Monro | |
| 8,352,839 B2 * | 1/2013 | Franceschini et al. | 714/779 |
| 2010/0277989 A1 | 11/2010 | Elfadel et al. | |
| 2010/0332895 A1 | 12/2010 | Billing et al. | |
| 2011/0080781 A1 | 4/2011 | Goux | |
| 2011/0119538 A1 | 5/2011 | Ipek et al. | |
| 2011/0296258 A1 | 12/2011 | Schechter et al. | |
| 2011/0307670 A1 | 12/2011 | Franceshini et al. | |
| 2011/0317480 A1 | 12/2011 | Lung et al. | |
| 2013/0332799 A1 * | 12/2013 | Cho et al. | 714/764 |

OTHER PUBLICATIONS

Eric Deal, "Trends in NAND Flash Memory Error Correction," Jun. 2009, Cyclic Design, pp. 1-11.

(Continued)

*Primary Examiner* — Justin R Knapp
(74) *Attorney, Agent, or Firm* — Steven J. Cahill

(57) ABSTRACT

A data storage system includes a memory circuit that has memory cells and a control circuit that is operable to receive data bits provided for storage in the memory cells. The control circuit is operable to receive a first matrix. Each row of the first matrix corresponds to a unique one of the data bits. The control circuit is operable to generate a second matrix having only the rows of the first matrix that correspond to the data bits provided for storage in a subset of the memory cells having stuck-at faults. The control circuit is operable to generate a third matrix having linearly independent columns of the second matrix. The control circuit is operable to encode the data bits to generate encoded data bits and redundant bits using the third matrix.

21 Claims, 6 Drawing Sheets

(56) References Cited

OTHER PUBLICATIONS

R. Micheloni, et al., "A 4Gb 2b/cell NAND Flash Memory with Embedded 5b BCH ECC for 36MB/s System Read Throughput," 2006 IEEE International Solid-State Circuits Conference, Feb. 6, 2006, Non-Volatile Memory, 7.6, pp. 1-10.
U.S. Appl. No. 13/649,072, filed Oct. 10, 2012.
H.-S. Philip Wong, et al., "Phase Change Memory," vol. 98, No. 12, Dec. 2010, Proceedings of the IEEE, pp. 2201-2227.
Nak Hee Seong, et al., "SAFER: Stuck-At-Fault Error Recovery for Memories," 2010 43rd Annual IEEE/ACM International Symposium on Microarchitecture, pp. 115-124, Dec. 8, 2010.
Stuart Schechter et al., "Use ECP, not ECC, for Hard Failures in Resistive Memories," ISCA '10 Proceedings of the 37th Annual International Symposium on Computer Architecture, Jun. 2010, pp. 141-152.
U.S. Appl. No. 13/649,007, filed Oct. 10, 2012.
Maddah et al. "Data Dependent Sparing to Manage Better-Than-Bad Blocks," Computer Science Department, University of Pittsburgh, Apr. 30, 2012.
U.S. Appl. No. 13/649,108, filed Oct. 10, 2012.

\* cited by examiner $$G = \begin{bmatrix} 0 & 0 & 1 \\ 0 & 0 & 0 \\ 0 & 1 & 0 \\ 1 & 0 & 0 \\ 0 & 1 & 1 \\ 1 & 0 & 1 \\ 1 & 1 & 1 \\ 1 & 1 & 0 \end{bmatrix} \begin{matrix} \text{row 0} \\ \text{row 1} \\ \text{row 2} \\ \text{row 3} \\ \text{row 4} \\ \text{row 5} \\ \text{row 6} \\ \text{row 7} \end{matrix}$$

column: 11 10 00

| Data Bits: | 1 | 0 | 0 | 0 | 1 | 0 | 1 | 0 |
|---|---|---|---|---|---|---|---|---|
| Bit Positions: | 0 | 1 | 2 | 3 | 4 | 5 | 6 | 7 |
| Memory Cells: |  | S0 | S0 | | S0 | | | S1 |

FIG. 5A $$M_s = \begin{bmatrix} 0 & 1 & 0 & 0 \\ 0 & 1 & 1 & 1 \\ 1 & 1 & 1 & 0 \end{bmatrix} \begin{matrix} \text{row 2} \\ \text{row 4} \\ \text{row 7} \end{matrix}$$

column: 11 10 01 00

$$M'_s = \begin{bmatrix} 0 & 1 & 0 \\ 0 & 1 & 1 \\ 1 & 1 & 0 \end{bmatrix} \begin{matrix} \text{row 2} \\ \text{row 4} \\ \text{row 7} \end{matrix}$$

column: 11 10 00

FIG. 5B $$M = \begin{bmatrix} 0 & 0 & 0 & 1 \\ 0 & 0 & 1 & 0 \\ 0 & 1 & 0 & 0 \\ 1 & 0 & 0 & 0 \\ 0 & 1 & 1 & 1 \\ 1 & 0 & 1 & 1 \\ 1 & 1 & 0 & 1 \\ 1 & 1 & 1 & 0 \end{bmatrix} \begin{matrix} \text{row 0} \\ \text{row 1} \\ \text{row 2} \\ \text{row 3} \\ \text{row 4} \\ \text{row 5} \\ \text{row 6} \\ \text{row 7} \end{matrix}$$

column: 11 10 01 00

$$\underbrace{\begin{bmatrix} 0 & 1 & 0 \\ 0 & 1 & 1 \\ 1 & 1 & 0 \end{bmatrix}}_{M'_s} \times V = \underbrace{\begin{bmatrix} 0 \\ 1 \\ 1 \end{bmatrix}}_{U} \longrightarrow V = \begin{bmatrix} 1 \\ 0 \\ 1 \end{bmatrix}$$

FIG. 5C $W = G \times V = \begin{bmatrix} 1 & 0 & 0 & 1 & 1 & 0 & 0 & 1 \end{bmatrix}$

| Data Bits: | 1 | 0 | 0 | 0 | 1 | 0 | 1 | 0 |
|---|---|---|---|---|---|---|---|---|
| Bit Positions: | 0 | 1 | 2 | 3 | 4 | 5 | 6 | 7 |

FIG. 5D

| Encoded Data Bits: | 0 | 0 | 1 | 0 | 0 | 1 | 1 |
|---|---|---|---|---|---|---|---|
| Bit Positions: | 0 | 1 | 2 | 3 | 4 | 5 | 6 | 7 |

FIG. 5E

| Index Bits: | 0 | 1 | 1 | 0 | 1 |
|---|---|---|---|---|---| column not selected ‖ vector V

ENCODING AND DECODING DATA TO ACCOMMODATE MEMORY CELLS HAVING STUCK-AT FAULTS

FIELD OF THE DISCLOSURE

The present disclosure relates to data storage systems, and more particularly, to techniques for encoding and decoding data to accommodate memory cells having stuck-at faults.

BACKGROUND

Many data communication systems use error correction encoders and decoders to detect and correct errors in data. A data communication system may, for example, correct random errors that are generated at a rate of about $1 \times 10^{-4}$. To protect against an error rate of about $1 \times 10^{-4}$, an error correction encoder generates encoded bits having about 10% more bits than its input bits.

Phase change memory (PCM) is a class of non-volatile memory. PCM devices have many advantages over traditional non-volatile flash memory. However, PCM devices may generate a large number of errors that are induced by degradation. For example, a PCM device may generate errors at a rate of $1 \times 10^{-2}$ or greater.

At the limits of endurance, the error rate in non-volatile memory devices is dominated by degradation. Errors that are caused by degradation include stuck-at faults, which have different statistics than the random errors that are common in data communication systems.

BRIEF SUMMARY

According to some embodiments, a data storage system includes a memory circuit that has memory cells and a control circuit. The control circuit is operable to receive data bits provided for storage in the memory cells. The control circuit is operable to receive a first matrix. Each row of the first matrix corresponds to a unique one of the data bits. The control circuit is operable to generate a second matrix having only the rows of the first matrix that correspond to the data bits provided for storage in a subset of the memory cells having stuck-at faults. The control circuit is operable to generate a third matrix having linearly independent columns of the second matrix. The control circuit is operable to encode the data bits to generate encoded data bits and redundant bits using the third matrix.

According to some embodiments, the control circuit is operable to receive encoded data bits read from the memory cells, and the control circuit is operable to receive redundant bits. The control circuit is operable to receive a first matrix. The control circuit is operable to generate a second matrix having a subset of columns from the first matrix that are selected based on a first subset of the redundant bits. The control circuit is operable to generate a first vector based on a second subset of the redundant bits. The control circuit is operable to generate a second vector based on the first vector and the second matrix. The control circuit is operable to apply the second vector to the encoded data bits to generate data bits.

Various objects, features, and advantages of the present invention will become apparent upon consideration of the following detailed description and the accompanying drawings.

BRIEF DESCRIPTION OF THE DRAWINGS

FIGS. 5A-5E illustrate examples of how the encoding operations of FIG. 3 can be applied to an exemplary set of data bits using exemplary encoding matrices, according to embodiments of the present invention.

DETAILED DESCRIPTION

According to some embodiments described herein, an encoder encodes input data bits to generate encoded data bits and redundant bits. The encoded data bits generated by the encoder are stored in memory cells of a memory circuit. The encoded data bits accommodate memory cells in the memory circuit that have stuck-at faults. The memory circuit may be, for example, a phase change memory circuit (e.g., that uses chalcogenide glass) or another type of memory circuit that has stuck-at faults.

A memory cell having a stuck-at fault is a memory cell that can only store a single digital value. A memory cell having a stuck-at fault value of 1 can only store a logic high digital value, and a memory cell having a stuck-at fault value of 0 can only store a logic low digital value. Thus, only a logic high digital value can be read from a memory cell having a stuck-at fault value of 1 (i.e., stuck-at 1), and only a logic low digital value can be read from a memory cell having a stuck-at fault value of 0 (i.e., stuck-at 0). Memory cells having stuck-at faults generally have stuck-at fault values that are stable over time.

If some of the memory cells in the memory circuit have stuck-at faults, the digital values of the stuck-at faults and the addresses of the memory cells having the stuck-at faults are determined before the encoding process and are provided to the encoder. The encoder generates the encoded data bits and the redundant bits using the digital values and addresses of the stuck-at faults. The encoded data bits are stored in the memory cells of the memory circuit. The redundant bits may be stored in the same memory circuit as the encoded data bits or in a different memory circuit.

Subsequently, the encoded data bits and the redundant bits are read from memory and provided to a decoder. The decoder decodes the encoded data bits using the redundant bits to regenerate the data bits. The data bits regenerated by the decoder do not contain errors that are caused by the known stuck-at faults in the memory circuit.

The techniques described herein are directly applicable to multi-level memory cells. Multi-level memory cells can store more than one bit per memory cell. For example, if a memory cell holds 2 bits, and it becomes stuck, then the values of those two bits are fixed, and they can be treated as two separate stuck-at fault locations. Because the location of one of the stuck-at faults is known, the location of the other stuck-at fault is also known. As a result, for the same stuck-at fault error rate, less redundant bits can be generated for multi-level memory cells than the redundant bits that are generated for single-level memory cells. The number of redundant bits may be smaller, for example, by a factor equal to the number of bits per memory cell.

Figure 1:
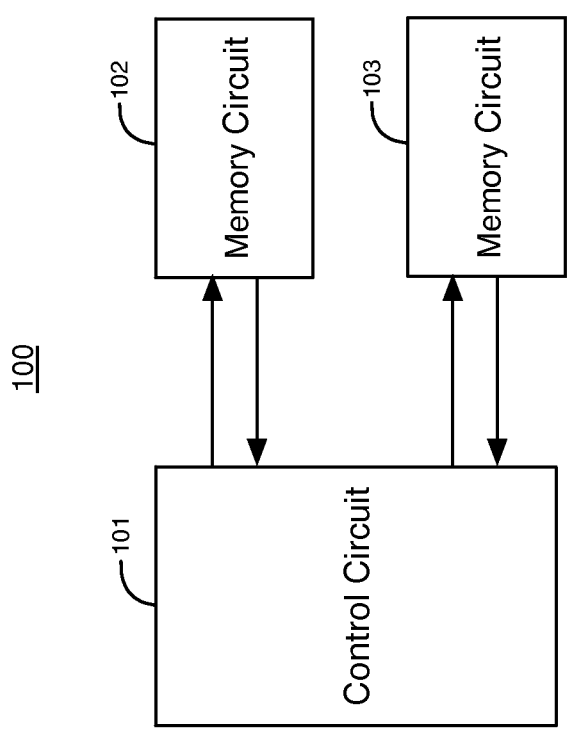
FIG. 1 illustrates an example of a data storage system, according to an embodiment of the present invention.

FIG. 1 illustrates an example of a data storage system 100, according to an embodiment of the present invention. Data storage system 100 includes a control circuit 101, a memory circuit 102, and a memory circuit 103. Control circuit 101 may be, for example, a memory controller circuit, a processor circuit, or any other type of control circuit that encodes and/or decodes data bits for storage in memory circuits 102-103. Control circuit 101 provides encoded data bits to and receives encoded data bits from memory circuits 102-103. The encoded data bits are stored in one or both of memory circuits 102-103. The redundant bits may be stored in one or both of memory circuits 102-103. The encoded data bits and redundant bits are transmitted between control circuit 101 and memory circuits 102-103 through one or more on-chip or external buses or through other types of signal lines. Control circuit 101, memory circuit 102, and memory circuit 103 may be in the same integrated circuit or in separate integrated circuits. Thus, system 100 may be a single integrated circuit device that includes circuits 101-103. Alternatively, system 100 may include three separate integrated circuit devices 101-103.

Figure 2:
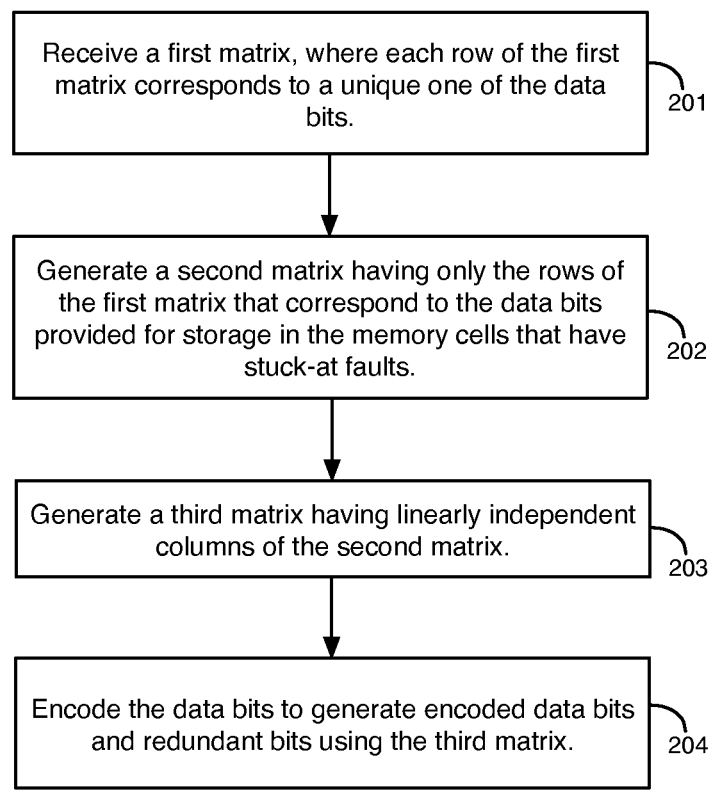
FIG. 2 is a flow chart that illustrates examples of operations for encoding data bits to generate encoded data bits and redundant bits for accommodating memory cells having stuck-at faults, according to an embodiment of the present invention.

FIG. 2 is a flow chart that illustrates examples of operations for encoding data bits to generate encoded data bits and redundant bits for accommodating memory cells in a memory circuit having stuck-at faults, according to an embodiment of the present invention. Each of the memory cells in the memory circuit stores at least one digital value. The encoded data bits are stored in the memory cells in the memory circuit. One or more of the memory cells has a stuck-at fault. The addresses of the memory cells with stuck-at faults and the digital values of the stuck-at faults are known prior to performing the operations of FIG. 2 and are provided to an encoder. For example, repeated read and write operations can be performed to determine which memory cells present errors that are consistent with stuck-at fault behavior. The encoded data bits generated by the operations of FIG. 2 are stored in the memory cells instead of the original data bits. The operations of FIG. 2 may, for example, be performed by an encoder in control circuit 101.

Initially, the encoder receives data bits that are provided for storage in the memory cells of the memory circuit. Each of the data bits is provided for storage in a corresponding memory cell of the memory circuit. One or more of the data bits is provided for storage in a corresponding memory cell that has a known stuck-at fault.

In operation 201, the encoder receives a first matrix. Each row of the first matrix corresponds to a unique one of the data bits. In operation 202, the encoder generates a second matrix having only the rows of the first matrix that correspond to the data bits provided for storage in the memory cells that have stuck-at faults. In operation 203, the encoder generates a third matrix having linearly independent columns of the second matrix. In operation 204, the encoder encodes the data bits to generate encoded data bits and redundant bits using the third matrix.

The digital values of the data bits that do not match their corresponding stuck-at faults are inverted to generate corresponding ones of the encoded data bits. The digital values of the data bits that match their corresponding stuck-at faults are not inverted to generate corresponding ones of the encoded data bits. According to various embodiments, the redundant bits may include index bits in an index, as described below.

Subsequently, the encoded data bits are stored in their corresponding memory cells in the memory circuit. The redundant bits are also stored in memory. The encoded data bits and the redundant bits may be stored in the same memory circuit or in different memory circuits. For example, the encoded data bits may be stored in memory circuit 102, and the redundant bits may be stored in memory circuit 103.

Figure 3:
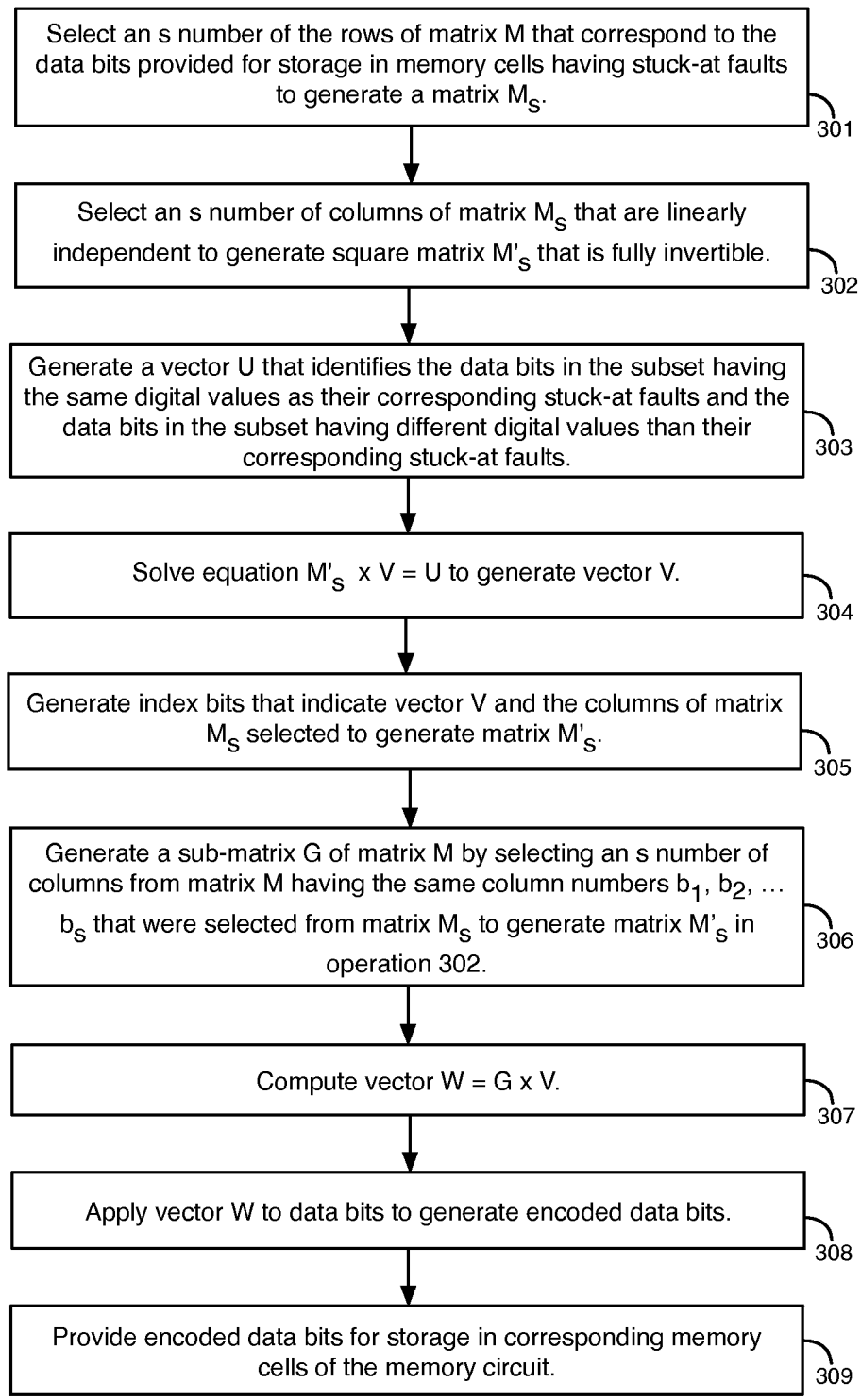
FIG. 3 is a flow chart that illustrates examples of more detailed operations for encoding data bits to generate encoded data bits and redundant bits for accommodating memory cells having stuck-at faults, according to an embodiment of the present invention.

FIG. 3 is a flow chart that illustrates examples of more detailed operations for encoding data bits to generate encoded data bits and redundant bits for accommodating memory cells having stuck-at faults, according to an embodiment of the present invention. The encoded data bits are stored in the memory cells of a memory circuit. One or more of the memory cells have stuck-at faults. The addresses of the memory cells with stuck-at faults and the digital values of the stuck-at faults are known prior to performing the operations shown in FIG. 3 and are provided to an encoder. The encoded data bits generated by the operations of FIG. 3 are stored in the memory cells instead of the input data bits. The operations of FIG. 3 may, for example, be performed by control circuit 101.

Initially, data bits are provided for storage in memory cells of a memory circuit. Each of the data bits is provided for storage in a corresponding memory cell of the memory circuit. A subset of the data bits are provided for storage in corresponding memory cells that have known stuck-at faults. The subset may include one or more data bits.

Prior to the process of encoding the data bits, a matrix M is generated that has a different row for each of the data bits. Each row of the matrix M corresponds to a unique one of the data bits. For a k number of data bits provided for storage in memory cells having an s number of stuck-at faults, the matrix M has a k number of rows, and any subset of an s number of rows of the matrix M are linearly independent, where s is a positive integer that is less than the positive integer k. Matrix M can be used to encode the data bits to generate encoded data bits that are stored in a k number of memory cells, where the s number of stuck-at faults are at any locations within the memory cells.

As an example, the matrix M may be generated using a block code, such as a parity check code. According to a more specific example, the matrix M is generated by taking the transpose of a parity check matrix of a BCH code, where BCH refers to Bose Chaudhuri Hocquenghem. For a k number of data bits provided for storage in memory cells having an s number of stuck-at faults (where s<k), a BCH code can be generated that has a block size equal to k, as follows. Given m>2, and t<$2^{m-1}$, a BCH code can be created such that the block length is n=$2^m$−1, the number of parity check bits is less than or equal to m×t, and the minimum distance is at least 2t+1, which also means that any 2t columns of the parity check matrix are linearly independent. Therefore, a BCH code is generated with block length k=$2^{log_2(k+1)}$−1 (therefore m=$log_2(k+1)$), and a minimum distance s+1 (therefore 2t+1=s+1, and thus t=s/2). The resulting parity check matrix $M_p$ of the BCH code with parameters n=k and t=s/2 has at most m×t=(s/2) $log_2(k+1)$ rows and k columns, with the property that any subset of 2t=s columns are linearly independent. For simplicity, $log_2 k$ is used instead of $log_2(k+1)$. The transpose of the parity check matrix $M_p$ is the matrix M. Thus, matrix M is the transpose of parity check matrix $M_p$ in this example. The number of parity check bits described above corresponds to the number of rows in the parity check matrix $M_p$, and therefore becomes the number of columns in the transposed matrix M.

FIG. 3 illustrates operations 301-309. In operation 301, the encoder selects an s number of the rows of matrix M that correspond to the data bits provided for storage in memory cells having stuck-at faults to generate a matrix $M_S$. The matrix M used in operation 301 is a matrix that is generated from a parity check matrix of a BCH code, as described above, or by any method that ensures that any s rows of the matrix M are linearly independent. Each row of matrix M that corresponds to one of the data bits provided for storage in a memory cell having a stuck-at fault is included as a row of matrix $M_S$. The rows of matrix M that correspond to data bits provided for storage in memory cells without known stuck-at faults are not included in matrix $M_S$. Thus, matrix $M_S$ has an s number of rows and an (s $\log_2$(k+1))/2 number of columns, if a BCH code is used. Matrix $M_S$ has full rank, because the s rows of matrix $M_S$ are guaranteed to be linearly independent by construction.

In operation 302, the encoder selects an s number of columns of the matrix $M_S$ that are linearly independent to generate a square matrix $M'_S$ that is fully invertible. Each of the columns of matrix $M_S$ is identified by a unique column number. The column numbers of the s columns of matrix $M_S$ that are selected in operation 302 to generate square matrix $M'_S$ are referred to as column numbers $b_1, b_2, \ldots b_S$. The encoder causes matrix $M'_S$ to have only the s number of columns of matrix $M_S$ that are indicated by column numbers $b_1, b_2, \ldots b_S$. The square matrix $M'_S$ generated in operation 302 has an s number of rows and an s number of columns. Also, matrix $M'_S$ has full rank with linearly independent columns, and thus, matrix $M'_S$ is fully invertible. In an embodiment, the encoder uses the reduced row echelon form of matrix $M_S$ to generate square matrix $M'_S$. Transforming $M_S$ into row echelon form is performed by using a sequence of row operations.

A subset of the data bits are provided for storage in corresponding memory cells that have known stuck-at faults. The encoder compares the subset of the data bits to the digital values of their corresponding stuck-at faults to determine which of the data bits in the subset have the same digital values as their corresponding stuck-at faults and which of the data bits in the subset have different digital values than their corresponding stuck-at faults. In operation 303 in FIG. 3, the encoder generates a vector U that identifies the data bits in the subset having the same digital values as their corresponding stuck-at faults and the data bits in the subset having different digital values than their corresponding stuck-at faults. Vector U is a 1×s vector that has an s number of values. Vector U has a 0 in its $i^{th}$ position if the $i^{th}$ stuck-at fault matches the digital value of its corresponding data bit and a 1 in its $i^{th}$ position if the $i^{th}$ stuck-at fault does not match the digital value of its corresponding data bit.

In operation 304, the encoder generates a vector V by solving the equation $M'_S \times V = U$. This equation has a solution, because matrix $M'_S$ is fully invertible. The encoder inverts matrix $M'_S$ and then multiplies the inversion of matrix $M'_S$ by vector U generated in operation 303 to generate vector V. Vector V is an s×1 vector having an s number of values.

In operation 305, the encoder generates index bits that indicate vector V and the columns of matrix $M_S$ that were selected in operation 302 to generate matrix $M'_S$. The index bits are redundant bits. The index bits are provided as an index associated with the encoded data bits generated in operation 308. The index bits are used by a decoder to decode the encoded data bits to regenerate the data bits.

In an embodiment of operation 305, the encoder generates a unique binary number to identify each of the s column numbers $b_1, b_2, \ldots b_S$ of matrix $M_S$ that were selected in operation 302 to generate matrix $M'_S$. These binary numbers are provided as a first subset of the index bits generated in operation 305. Thus, in this embodiment, the first subset of the index bits identifies each of the column numbers $b_1, b_2, \ldots b_S$ of matrix $M_S$ that were selected in operation 302 to generate matrix $M'_S$. The number of index bits used to indicate the binary numbers that identify the column numbers $b_1, b_2, \ldots b_S$ of matrix $M_S$ used to generate matrix $M'_S$ is shown below in equation (1).

$$2s + s\log_2 \frac{s\log_2 k}{2s} = s + s\log_2 \log_2 k \quad (1)$$

Equation (1) equals less index bits than an index that records the exact bit positions of an s number of stuck-at faults out of k bit positions, as long as (s $\log_2$ k)/2<k.

In operation 305, the encoder also generates an s number of index bits that indicate the values of vector V. The s number of index bits that indicate the values of vector V are a second subset of the index bits generated in operation 305. The total number of index bits generated in operation 305 is shown below in equation (2).

$$\text{total number of index bits} = 2s + s \log_2 \log_2 k \quad (2)$$

According to another embodiment of operation 305, the encoder generates a unique binary number to identify each of the ((s $\log_2$ k)/2−s) column numbers of matrix $M_S$ that were not selected in operation 302 to generate matrix $M'_S$. These binary numbers are provided as the first subset of the index bits generated in operation 305. In this embodiment, the first subset of the index bits identifies each of the column numbers of matrix $M_S$ that were not selected to generate matrix $M'_S$ in operation 302. A decoder infers the columns of matrix $M_S$ that were selected to generate matrix $M'_S$ based on the binary numbers in the index indicating the column numbers of matrix $M_S$ that were not selected to generate matrix $M'_S$. In this embodiment, the encoder also generates an s number of index bits that indicate the values of vector V in operation 305.

Only the vector V in the index bits depends on whether the data bits in the subset match or do not match the digital values of their corresponding stuck-at faults. The remaining index bits only depend on the locations of the stuck-at faults within the corresponding memory cells. Only an s number of the index bits change when encoding different sets of data bits for the same memory cells. The remaining index bits remain the same when encoding different sets of data bits for the same memory cells.

Each of the columns of the matrix M is identified by a unique column number. The columns of matrix M are identified by the same column numbers that identify the corresponding columns of matrix $M_S$. In operation 306, the encoder generates a sub-matrix G of matrix M by selecting an s number of columns from matrix M having the same column numbers $b_1, b_2, \ldots b_S$ that were selected from matrix $M_S$ to generate matrix $M'_S$ in operation 302. Sub-matrix G has a k number of rows and an s number of columns. The encoder causes sub-matrix G to have the s number of columns from matrix M having the column numbers $b_1, b_2, \ldots b_S$ that were selected from matrix $M_S$ to generate matrix $M'_S$ in operation 302.

In operation 307, the encoder computes a vector W that equals sub-matrix G times vector V (i.e., W=G×V). Vector W is a k×1 vector having k values, where k is the number of data bits. In operation 308, the encoder applies vector W to the data bits to generate encoded data bits. In operation 308, the encoder generates the encoded data bits by inverting each of the $i^{th}$ data bits that has a corresponding $i^{th}$ value in vector W equal to 1 and by not inverting each of the $i^{th}$ data bits that has a corresponding $i^{th}$ value in vector W equal to 0. Because $M'_S \times V = U$, the subset of the encoded data bits that are provided for storage in memory cells having stuck-at faults have the same digital values as their corresponding stuck-at faults. In operation 309, the encoder provides the encoded data bits for storage in the corresponding memory cells of the memory circuit.

Some of the operations shown in and described above with respect to FIG. 3 may be performed in a different order than the order shown in FIG. 3. For example, operation 306 may be performed prior to operations 304-305.

Figure 4:
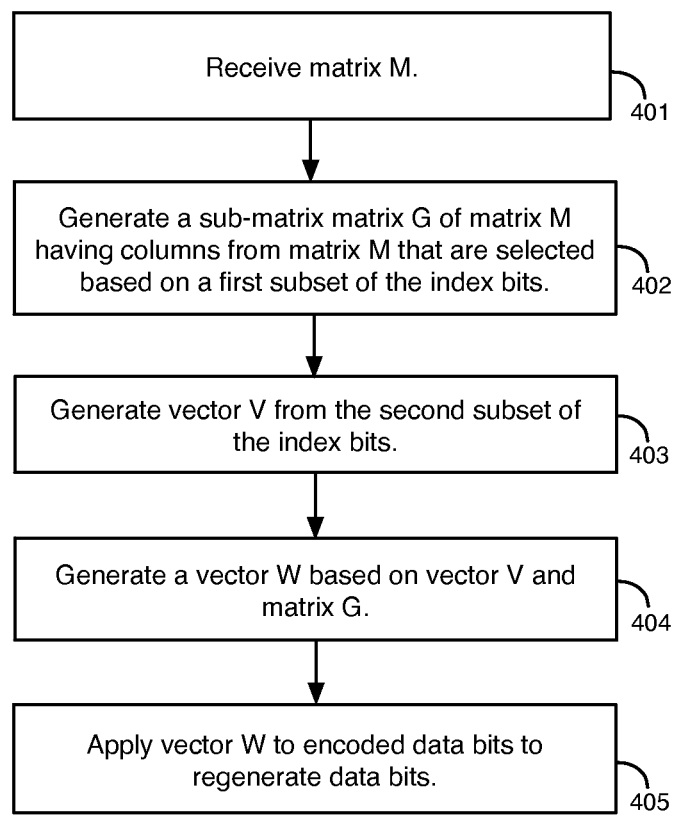
FIG. 4 is a flow chart that illustrates examples of operations for decoding the encoded data bits generated by the operations of FIG. 2 and/or FIG. 3 to regenerate the data bits using the redundant bits, according to an embodiment of the present invention.

FIG. 4 is a flow chart that illustrates examples of operations for decoding the encoded data bits generated by the operations of FIG. 2 and/or FIG. 3 to regenerate the data bits using the redundant bits, according to an embodiment of the present invention. Initially, the encoded data bits are read from the memory cells of the memory circuit. The encoded data bits and the index bits (i.e., the redundant bits) are then provided to a decoder in a control circuit, such as control circuit 101.

In operation 401, the decoder receives the matrix M. The matrix M in operation 401 is the same matrix M that was used to generate the encoded data bits in the operations of FIG. 3. Any subset of an s number of rows of the matrix M are linearly independent. In operation 402, the decoder generates a sub-matrix matrix G of matrix M having columns from matrix M that are selected based on a first subset of the index bits.

As discussed above with respect to the first embodiment of operation 305 in FIG. 3, a first subset of the index bits identifies each of the s column numbers $b_1, b_2, \ldots b_S$ of matrix $M_S$ that were selected in operation 302 to generate matrix $M'_S$. As discussed above with respect to the second embodiment of operation 305 in FIG. 3, the first subset of the index bits identifies each of the column numbers of matrix $M_S$ that were not selected to generate matrix $M'_S$ in operation 302.

In the first embodiment of operation 305, the decoder causes sub-matrix G to have the s number of columns from matrix M having the column numbers $b_1, b_2, \ldots b_S$ that are indicated by the first subset of the index bits in operation 503. In the second embodiment of operation 305, the decoder causes sub-matrix G to have the s number of columns from matrix M having the column numbers $b_1, b_2, \ldots b_S$ that are not indicated by the first subset of the index bits in operation 503. Sub-matrix G has a k number of rows and an s number of columns.

As discussed above with respect to operation 305 in FIG. 3, a second subset of the index bits indicates an s number of values of a vector V. The second subset of index bits has an s number of bits. In operation 403, the decoder generates vector V from the second subset of the index bits. In operation 404, the decoder generates a vector W based on vector V and matrix G. The decoder computes vector W by solving the equation $W = G \times V$.

In operation 405, the decoder applies vector W to the encoded data bits to regenerate the data bits. In operation 405, the decoder regenerates the data bits by inverting each of the $i^{th}$ encoded data bits that has a corresponding $i^{th}$ value in vector W equal to 1 and by not inverting each of the $i^{th}$ encoded data bits that has a corresponding $i^{th}$ value in vector W equal to 0.

FIGS. 5A-5E illustrate examples of how the encoding operations of FIG. 3 can be applied to an exemplary set of data bits using exemplary encoding matrices, according to embodiments of the present invention. FIG. 5A illustrates an exemplary set of eight data bits having bit positions numbered 0-7. The eight data bits are provided for storage in eight corresponding memory cells of a memory circuit as shown in FIG. 5A. The memory cells corresponding to bit positions 2, 4, and 7 have stuck-at faults. The memory cells at bit positions 2 and 4 are stuck-at 0 as indicated by S0 in FIG. 5A, and the memory cell at bit position 7 is stuck-at 1 as indicated by S1 in FIG. 5A.

FIG. 5B illustrates 4 exemplary encoding matrices M, $M_S$, $M'_S$, and G. Matrix M in the example of FIG. 5B has 8 rows and 4 columns. The eight rows of matrix M are referred to as rows 0-7 in FIG. 5B. Each of the 8 rows of matrix M corresponds to a different one of the 8 data bits. Because the eight data bits are provided for storage in memory cells that have three stuck-at faults at corresponding bit positions 2, 4, and 7, the encoder causes matrix $M_S$ to have only the rows 2, 4, and 7 of matrix M that correspond to the memory cells with the stuck-at faults in operation 301. The other rows of matrix M are not added to matrix $M_S$. Matrix $M_S$ has three rows and four columns. The four columns in each of matrices M and $M_S$ are columns 0, 1, 2, and 3, which are referred to in binary as column numbers 00, 01, 10, and 11, respectively, in FIG. 5B.

The columns of matrix $M_S$ indicated by column numbers 11, 10, and 00 are linearly independent. Column number 01 is a linear combination of column numbers 11 and 00. Therefore, the encoder causes matrix $M'_S$ to have the three columns of matrix $M_S$ that have column numbers 11, 10, and 00, as shown in FIG. 5B. Column numbers 11, 10, and 00 of matrix $M_S$ and matrix $M'_S$ are the column numbers $b_1$, $b_2$, and $b_3$, respectively, that are selected in operation 302. The square matrix $M'_S$ has three rows and three columns. Column number 01 of matrix $M_S$ is not added to matrix $M'_S$.

In operation 306, the encoder generates sub-matrix G of matrix M, as described above. Sub-matrix G has all eight rows of matrix M, but sub-matrix G has only the three columns of matrix M that have column numbers 11, 10, and 00, as shown in FIG. 5B. Sub-matrix G has only the columns of matrix M having the same column numbers 11, 10, and 00 (i.e., $b_1$, $b_2$, and $b_3$) that were selected from matrix $M_S$ to generate matrix $M_S'$ in operation 302.

In operation 303, the encoder generates vector U, as described above. Because the stuck-at fault of the memory cell corresponding to bit position 2 has the same digital value as the data bit at bit position 2 as shown in FIG. 5A, the first value of vector U is 0, as shown in FIG. 5C. Because the stuck-at faults of the memory cells corresponding to bit positions 4 and 7 have different digital values than the data bits at bit positions 4 and 7, respectively, as shown in FIG. 5A, the second and third values of vector U are 1, as shown in FIG. 5C.

FIG. 5C illustrates an example of the encoder performing operation 304 to generate a vector V by solving the equation $M'_S \times V = U$. The encoder inverts matrix $M'_S$ and then multiplies the inversion of matrix $M'_S$ by vector U to generate vector V. Vector V is a 3×1 vector in the example of FIG. 5C.

FIG. 5D illustrates an example of the encoder performing operation 307 to generate a vector W by solving the equation $W = G \times V$. In the example of FIG. 5D, vector W is a 1×8 vector having eight values. After the encoder calculates vector W, the encoder then applies vector W to the data bits to generate the encoded data bits that are shown in FIG. 5E. The encoder may, for example, apply the vector W to the data bits by performing modulo 2 addition on each pair of an $i^{th}$ value of vector W and a corresponding $i^{th}$ data bit to generate the encoded data bits.

FIG. 5E also illustrates index bits for the encoded data bits. The first two index bits indicate the column number 01 of the column of matrix $M_S$ that was not transferred to matrix $M'_S$, as described above with respect to the second embodiment of operation 305. The decoder infers the three columns of matrix $M_S$ that were used to generate matrix $M'_S$ based on the first two index bits indicating the column number 01 of the column of matrix $M_S$ that was not transferred to matrix $M'_S$ in operation 302. The next 3 index bits indicate the values 101 of vector V.

According to another embodiment, the number of index bits in the index can be reduced if the number k of data bits is very large. This embodiment is referred to as an asymptotic improvement. In this embodiment, a block of data bits is provided for storage in corresponding memory cells of a memory circuit. For some parameter t, where t is a positive integer, the block of data bits is split into an s/t number of sub-blocks, where s is the number of stuck-at faults in the corresponding memory cells of the memory circuit. Each of the sub-blocks of data bits corresponds to a subset of the memory cells. Each of the subsets of the memory cells has exactly the same number t of memory cells that have stuck-at faults. Let $a_1, a_2, \ldots, a_{s/t}$ be the numbers of data bits in the s/t number of sub-blocks of data bits. Each of the sub-blocks may have a different number of data bits. Alternatively, some or all of the sub-blocks may have the same number of data bits.

In order to store the numbers of data bits $a_1, a_2, \ldots, a_{s/t}$ in the sub-blocks, an encoder generates a number of index bits equal to $$\frac{2s}{t} + \frac{s}{t}\log_2\left(\frac{kt}{s}\right),$$

where k is the total number of data bits in the block of data bits. For each of the sub-blocks of data bits, the encoder uses the linear algebraic technique described above with respect to FIG. 3 that generates a number of index bits in the index equal to $2t+t \log_2 \log_2 a_i$. The total number of index bits generated by the encoder for this embodiment is shown in equation (3).

$$\text{number of index bits} = 2s + t(\Sigma_{s/t}^{i=1} \log_2 \log_2 a_L) \quad (3)$$

The function $\log_2 \log_2 x$ is a concave function. Equation (3) is at its maximum value when all of the $a_i$'s in equation (3) are equal, such that each of the sub-blocks has the same number of bits. Equation (4) below shows the total number of index bits generated by the encoder for this embodiment when each of the sub-blocks has the same number of bits.

$$\text{number of index bits} = 2s + s\log_2\log_2\frac{kt}{s} + \frac{2s}{t} + \frac{s}{t}\log_2\frac{kt}{s} \quad (4)$$

The number of index bits in the index in this embodiment can be minimized with respect to parameter t. If q=k/s, then $t=(\log_2 q)^2$ minimizes the number of index bits in the index in this embodiment. For this value of t, the total number of index bits in the index is shown below in equation (5).

$$\text{number of index bits} = \quad (5)$$
$$2s + s\log_2\log_2(q\log_2^2 q) + \frac{2s}{\log_2^2 q} + \frac{s}{\log_2^2 q \times \log_2(q\log_2^2 q)}$$

The second term of equation (5) is approximately $s \log_2 \log_2 q$. Each of the remaining terms of equation (5) is smaller than s, if q>3. Therefore, equation (5) can be simplified as shown below in equation (6). Equation (6) below shows the maximum number of index bits according to this approximation.

$$\text{number of index bits} = 3s + s \log_2 \log_2 q \quad (6)$$

Embodiments of the present invention can, for example, be implemented using one or a combination of hardware, software, and a computer-readable medium containing program instructions. Embodiments of the present invention can be embodied as program code stored on a non-transitory computer readable medium that can be run on a computer. Software implemented by embodiments of the present invention and results of the present invention can be stored on a computer-readable medium such as semiconductor memory, phase change memory, hard disk drive, compact disc (CD), digital video disc (DVD), or other media. Results of the present invention can be used for various purposes such as being executed or processed by a processor, being displayed to a user, transmitted in a signal over a network, etc. Embodiments of the present invention may also be embodied as a computer readable program code unit stored on a non-transitory computer readable medium, for causing a number of computer systems connected via a network to affect distributed processing.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A data storage system comprising:
   a memory circuit comprising memory cells; and
   a control circuit to receive data bits provided for storage in the memory cells,
   wherein the control circuit receives a first matrix, wherein each row of the first matrix corresponds to a unique one of the data bits, wherein the control circuit generates a second matrix having only the rows of the first matrix that correspond to the data bits provided for storage in a subset of the memory cells having stuck-at faults, wherein the control circuit generates a third matrix having linearly independent columns of the second matrix, and
   wherein the control circuit encodes the data bits to generate encoded data bits and redundant bits using the third matrix.

2. The data storage system of claim 1, wherein the control circuit compares each of the data bits provided for storage in a corresponding one of the memory cells having a stuck-at fault to a value of the stuck-at fault, and wherein the control circuit generates a first vector identifying each of the data bits having a different value than the value of the stuck-at fault of the corresponding one of the memory cells and identifying each of the data bits having a same digital value as the value of the stuck-at fault of the corresponding one of the memory cells.

3. The data storage system of claim 2, wherein the control circuit inverts the third matrix to generate a fourth matrix, wherein the control circuit multiplies the fourth matrix by the first vector to generate a second vector, and wherein the memory circuit stores the encoded data bits in the memory cells.

4. The data storage system of claim 3, wherein the control circuit causes the redundant bits to indicate the second vector and the linearly independent columns of the second matrix that are in the third matrix.

5. The data storage system of claim 3, wherein the linearly independent columns of the second matrix that are in the third matrix have column numbers, and wherein the control circuit generates a fifth matrix having only columns from the first matrix that have the same column numbers as the linearly independent columns of the second matrix that are in the third matrix.

6. The data storage system of claim 5, wherein the control circuit multiplies the fifth matrix by the second vector to generate a third vector, and wherein the control circuit applies the third vector to the data bits to generate the encoded data bits.

7. The data storage system of claim 1, wherein the memory circuit comprises an s number of memory cells having stuck-at faults, and wherein any subset of an s number of rows of the first matrix are linearly independent.

8. The data storage system of claim 1, wherein the first matrix is generated by transposing a parity check matrix of a BCH code.

9. A data storage system comprising:
a memory circuit comprising memory cells; and
a control circuit to receive encoded data bits read from the memory cells, wherein the control circuit receives redundant bits,
wherein the control circuit receives a first matrix, wherein the control circuit generates a second matrix having a subset of columns from the first matrix that are selected based on a first subset of the redundant bits, wherein the control circuit generates a first vector based on a second subset of the redundant bits, wherein the control circuit generates a second vector based on the first vector and the second matrix, and
wherein the control circuit applies the second vector to the encoded data bits to generate data bits.

10. The data storage system of claim 9, wherein the control circuit generates the second vector by multiplying the first vector by the second matrix.

11. The data storage system of claim 10, wherein the control circuit adds each of the encoded data bits to a corresponding value of the second vector using modulo 2 addition to generate a corresponding one of the data bits, and wherein the first matrix is generated by transposing a parity check matrix of a BCH code.

12. The data storage system of claim 9, wherein the control circuit and the memory circuit are in one integrated circuit.

13. The data storage system of claim 9, wherein the control circuit is in a first integrated circuit, and wherein the memory circuit is in a second integrated circuit.

14. A method for a data storage system comprising:
receiving data bits that are provided for storage in memory cells of a memory circuit;
receiving a first matrix, wherein each row of the first matrix corresponds to a different one of the data bits;
generating a second matrix having only the rows of the first matrix that correspond to the data bits provided for storage in a subset of the memory cells having stuck-at faults using a control circuit;
generating a third matrix having linearly independent columns of the second matrix using the control circuit; and
encoding the data bits to generate encoded data bits and redundant bits based on the third matrix using the control circuit.

15. The method of claim 14 further comprising:
comparing each of the data bits provided for storage in a corresponding one of the memory cells having a stuck-at fault to a value of the stuck-at fault using the control circuit; and
generating a first vector identifying each of the data bits having a different value than the value of the stuck-at fault of the corresponding one of the memory cells and identifying each of the data bits having a same value as the value of the stuck-at fault of the corresponding one of the memory cells using the control circuit.

16. The method of claim 15 further comprising:
inverting the third matrix to generate a fourth matrix using the control circuit; and
multiplying the fourth matrix by the first vector to generate a second vector using the control circuit.

17. The method of claim 16, wherein encoding the data bits to generate encoded data bits and redundant bits based on the third matrix using the control circuit further comprises causing the redundant bits to indicate the second vector and the linearly independent columns of the second matrix that are in the third matrix.

18. The method of claim 16, wherein the linearly independent columns of the second matrix that are in the third matrix have column numbers, and the method further comprises:
generating a fifth matrix having a subset of columns from the first matrix that have the same column numbers as the linearly independent columns of the second matrix that are in the third matrix using the control circuit.

19. The method of claim 18, further comprising:
multiplying the fifth matrix by the second vector to generate a third vector using the control circuit, and
wherein encoding the data bits to generate encoded data bits and redundant bits based on the third matrix using the control circuit further comprises applying the third vector to the data bits to generate the encoded data bits.

20. A method for a data storage system comprising:
receiving encoded data bits read from memory cells of a memory circuit;
receiving redundant bits;
receiving a first matrix;
generating a second matrix having a subset of columns from the first matrix that are selected based on a first subset of the redundant bits using a control circuit;
generating a first vector based on a second subset of the redundant bits using the control circuit;
generating a second vector based on the first vector and the second matrix using the control circuit; and
applying the second vector to the encoded data bits to generate data bits using the control circuit.

21. The method of claim 20, wherein generating a second vector based on the first vector and the second matrix further comprises generating the second vector by multiplying the first vector by the second matrix.

* * * * *